Dec. 29, 1942.  S. G. HARRIS  2,306,624
CONTAINER FOR CRAB SHELLS
Filed Jan. 31, 1941  2 Sheets-Sheet 1
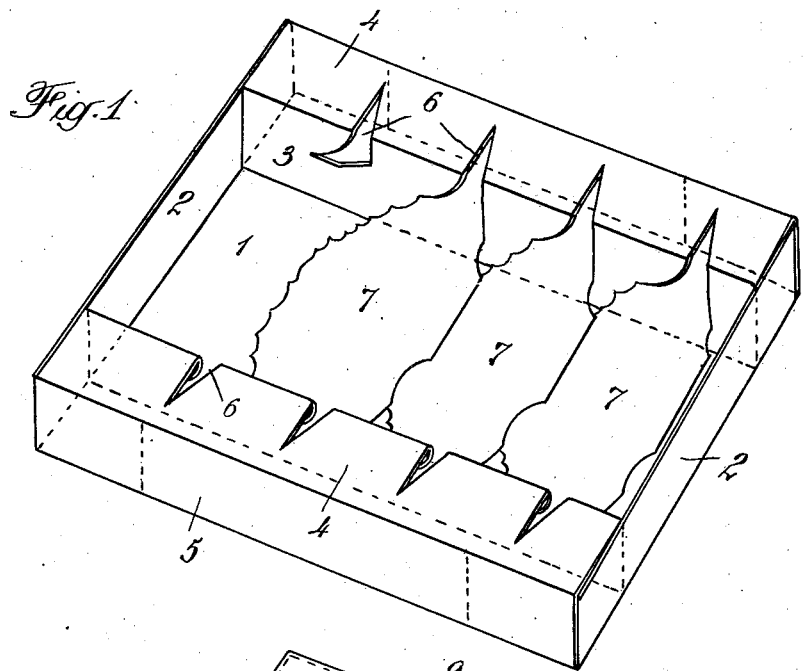
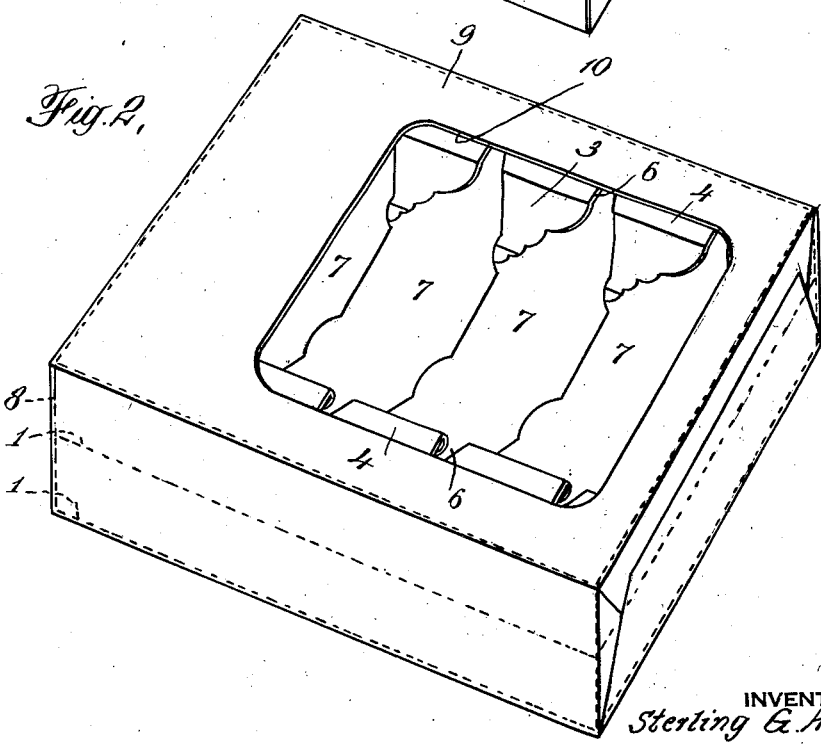
INVENTOR
Sterling G. Harris
BY
ATTORNEYS Dec. 29, 1942.  S. G. HARRIS  2,306,624
CONTAINER FOR CRAB SHELLS
Filed Jan. 31, 1941  2 Sheets-Sheet 2
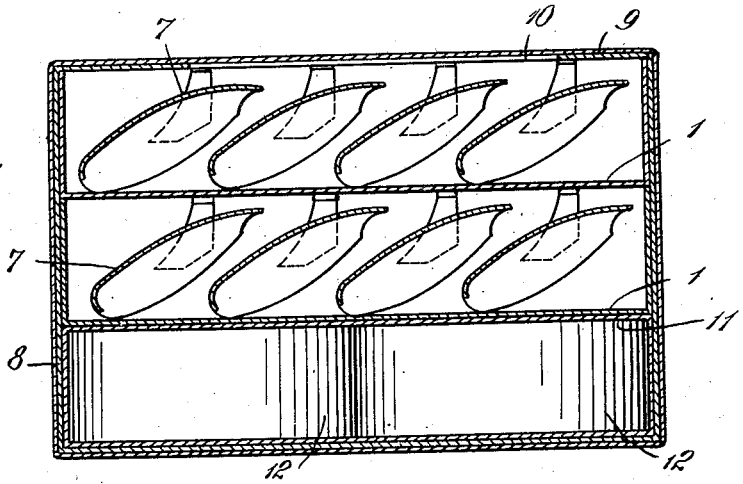
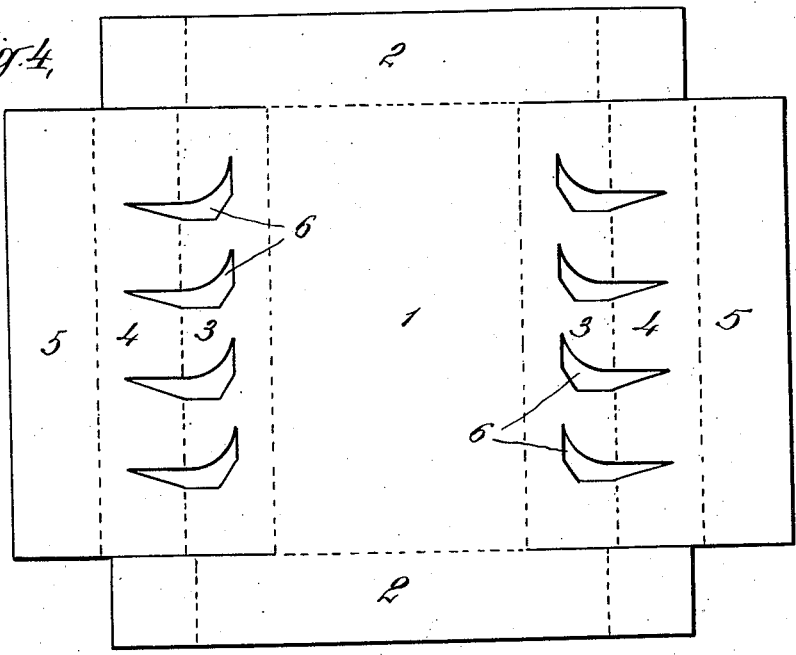
INVENTOR
Sterling G. Harris
BY
Pennie, Davis, Marvin & Edmonds
ATTORNEYS Patented Dec. 29, 1942

2,306,624

UNITED STATES PATENT OFFICE 2,306,624

CONTAINER FOR CRAB SHELLS

Sterling Grover Harris, Centerville, Md., assignor to The Blue Channel Corporation, Centerville, Md., a corporation of Maryland Application January 31, 1941, Serial No. 376,740

2 Claims. (Cl. 206—65)

This invention relates to shipping containers for crab shells.

In preparing deviled crabs it has long been the custom to stuff the crab meat, before baking, into the shell of the crab whence it came, the shell thereby serving as a convenient and appropriate baking dish. It has been supposed—not without reason—by those skilled in such matters, that baking the deviled meat in the shell itself contributes somehow to the flavor; in any event the presence of the shell undeniably enhances the gustatory pleasure that is or should be attendant upon the eating of this delicacy. In recent years, however, the advent of crab meat in cans has made it generally impossible for the cook to follow this ancient and pleasant custom, the crab shells, unfortunately, having been eliminated at the cannery. To avoid this, and to salvage the shells for service would not, itself, be difficult, but to deliver them intact to the kitchen presents a real problem, for these shells are fragile and easily shattered.

It is, therefore, the object of my invention to provide a shipping container in which empty crab shells can be packaged and transported without breakage and from which they can be easily removed when needed.

In achieving this object, I have provided a shallow tray or rack slightly narrower than the long dimension of the shell and having notched side walls with the notches extending downwardly at an angle. Into these notches the spiked ends of the shell are inserted, the shell being held at an angle to the bottom of the tray and resting on its forward edge. A number of shells can thus be packaged in such a tray. As the end spikes and the front of the shell containing the eye sockets are the heaviest and strongest parts, the shell is supported in a manner best calculated to avoid breakage, the delicate top and rear portions of the shell being protected and supporting no weight. Horizontal flanges extending outwardly from the side walls and themselves preferably terminating in downwardly extending flanges provide, in effect, double side walls which completely protect the ends of the shells. One or more of these trays may be mounted within a container the upper face of which is preferably provided with an opening through which the shells of the upper tray are visible. In order that the package may be complete, I may also provide a compartment below the trays for the reception of cans of crab meat.

In the accompanying drawings I have illustrated certain preferred embodiments of my invention. In these, Figure 1 is a perspective view of one of the trays showing three crab shells packed within it; Figure 2 is a perspective view of a package containing two trays; Figure 3 is a vertical longitudinal section through a package containing two trays of shells and having a lower compartment in which two cans of crab meat are packed; and Figure 4 is a view of the unfolded blank from which the trays are made.

The tray illustrated in Figure 1 is made of a single piece of cardboard, folded from the blank shown in Figure 4. It comprises a bottom 1, end walls 2 and inner side walls 3. Extending outwardly from the upper edge of each inner side wall is a horizontal panel portion 4 terminating in a downwardly extending flange or outer side wall 5. Thus the horizontal panel portions are connected to the inner and outer side walls along inner and outer fold lines. The side walls 3 and flanges 4 are provided with generally crescent-shaped notches 6 extending across the line of junction, the part of the notch in the horizontal panel portion extending normal to the side wall, while the part in the side wall extends forwardly and downwardly at an angle, as shown both in Figure 1 and Figure 4. As shown in the drawings, each tray is provided with four pairs of these notches, the notches of each pair being oppositely positioned.

The shells 7 are placed within the tray with the forward or eye-socket edge of the shell pointing downwardly and designed to rest on the bottom of the tray. (The shells illustrated in the drawings are carapaces of the common blue crab which frequents the coastal waters of eastern and southeastern United States.) The end spikes are inserted within the notches and the shell moved forward so that the contiguous portions of the shell fit snugly within the forwardly extending portion of the notch. The position of the shells in the tray is best illustrated in Figure 3. The shells are thus securely held in position in the tray and cannot easily be dislodged during shipment. Each shell is supported directly by the tray and is, for the most part, not in contact with any other shell, except very lightly. The shells can be easily removed from the tray by sliding them backwardly and upwardly. Another method of removing them is to unfold the tray, thus automatically disengaging the side walls from the spikes and leaving all four shells lying on the bottom of the tray.

In Figure 2 I have illustrated a container 8 in which two trays, constructed as shown in Figure 1, are enclosed, one above the other. The upper face 9 of the container is provided with an opening 10 through which the shells may be seen and thus contribute to the attractiveness of the package. The opening may be closed with a transparent material, such as Cellophane, or the entire package may be wrapped in Cellophane, if desired.

In Figure 3, there is illustrated a further modification of the package which includes a bottom compartment 11 in which cans of crab meat 12 are placed. In the package illustrated in Fig. 3, the trays lie one above the other and the cans beneath, but, if desired, the container may be of such shape and size as to permit the trays to be stood one end above the can compartment.

I claim:

1. A shipping tray for crab shells formed from a one-piece blank, comprising a bottom and oppositely positioned inner and outer vertical side walls, the inner side walls being integral with the bottom and the respective inner and outer side walls being connected by a horizontal panel portion along inner and outer fold lines, the inner walls and their respective panel portions having oppositely positioned notches extending across the respective inner fold lines, the sides of the portions of each of the notches which are within the horizontal panels converging from the inner fold line intersected thereby and terminating in an acute angle, one side of each of the portions of the notches which are within the horizontal panel portions being normal to said intersected fold line, and the continuation of each of said sides in the adjoining side walls curving away from the other sides of the portions of the notches in the horizontal panel portions, the continuation of each of the said other sides of the portions of the notches in the horizontal panels into the adjoining side walls extending forwardly and downwardly and meeting said curved sides of the notches and each forming an acute angle therewith, so that the portions of the notches in the horizontal panel portions and in the inner side walls, together, form notches of general crescent-shape adapted to receive and hold the end spikes of a crab shell.

2. A merchandizing package comprising a shipping tray having a bottom, side walls and horizontal panel portions extending outwardly from the upper edges of the side walls, the horizontal panel portions and the side walls having oppositely positioned notches designed to receive and hold the end spikes of a crab shell, one edge of the notches in the respective horizontal panel portions being substantially normal to the line of juncture of the side walls and horizontal panel portions, and the other edge of the notches in the respective horizontal panel portions converging outwardly, the notches in the side walls being downwardly inclined in the direction towards said normal edges of the notches in the horizontal panel portions, and crab shells within the tray, said crab shells being inclined at an angle substantially corresponding to the angle of inclination of the notches in the side walls and having their forward edges resting on the bottom of the tray and their spikes received in the oppositely positioned notches.

STERLING GROVER HARRIS.